United States Patent [19]

Chen

[11] Patent Number: 5,712,718
[45] Date of Patent: Jan. 27, 1998

[54] BOOK-EDGE FLAT-BED SCANNER

[75] Inventor: Philip L. Chen, E. Rolling Hills, Calif.

[73] Assignee: Avision, Inc., Hsinchu, Taiwan

[21] Appl. No.: 824,129

[22] Filed: Mar. 26, 1997

Related U.S. Application Data

[63] Continuation of Ser. No. 526,356, Sep. 11, 1995, abandoned.

[51] Int. Cl.⁶ ............................................. G02B 26/08
[52] U.S. Cl. ........................... 359/201; 355/25; 358/474; 399/211
[58] Field of Search ................................ 359/196, 197, 359/201, 212, 223; 250/234–236; 358/474, 475, 487, 497; 355/25, 228, 229, 232, 233, 82; 399/193, 211

[56] References Cited

U.S. PATENT DOCUMENTS

| 3,395,610 | 8/1968 | Evans et al. | 355/233 |
| 5,012,275 | 4/1991 | Bock | 355/233 |
| 5,475,505 | 12/1995 | Minasian et al. | 358/474 |

*Primary Examiner*—James Phan
*Attorney, Agent, or Firm*—H. C. Lin, Patent Agent

[57] ABSTRACT

This invention provides a flat-bed scanner capable of scanning a thick book without any distortion at the protruding binding edge. The scanning window forms an obtuse angle with the frame of the scanner supporting the scanning window. The obtuse angle allows the binding edge of the book to rest snugly over the window. The slanted structure of the frame also makes room for the image reading head to scan to the very edge of the page of the document.

6 Claims, 6 Drawing Sheets

BOOK-EDGE FLAT-BED SCANNER

This application is a continuation of application Ser. No. 08/526,356, filed Sep. 11, 1995, now abandoned.

This invention relates to an image scanning system, in particular, for scanning thick books without causing a distorted image at the binding fold.

BACKGROUND OF THE INVENTION

Flat-bed image scanners have become very popular as peripheral equipment for computers. A scanner can scan documents, magazines, books, figures, etc. for storage in a computer, which can then further process the information, or for sensitizing some phtosensitive material.

FIG. 1 shows the basic structure of a flat-bed scanner. In this structure, there is an image reading head 10, a scanning mechanism 4, an image processing circuit 5, a glass scanning window 2 and a frame 3. The image reading head 10 includes a light source 1, reflecting mirrors 111, 112, 113, lens 12 and a charge coupled device (CCD) sensor 13. The scanning mechanism 4 includes a motor 41, gear trains 421, 422, an idler 423, a belt 43 for coupling the gears 422 and 423, a guiding rail 44 for the image reader 10, etc.

The operating principle of a conventional flat-bed scanner is as follows: As shown in FIG. 1, a document D to be scanned is placed on the window 2. An image of the document is obtained in the reflected light L of the incident light source 1 and is read by the image reading head 10. The image reflected by the mirrors 111–113 and the lens 12 is formed at the sensor 13. The signal received by the sensor 13 is processed by a processing circuit 5 for conversion into digital signals and inputted into a computer (not shown) for further processing. When the image sensor receives a row or a section of image signals, the scanning mechanism 4 moves the image reading head 10 to another scanning position to scan over again until the complete image is read.

Alternatively, the electrical signals can be used as a laser writer in a digital copier. In a non-digital copier, the sensor can be a photosensitive drum.

In the present-day scanner in the market, when a book is scanned near the binding edge, the page of the book is protruded and cannot be in intimate contact with the glass window 2, as shown in FIG. 1. As a result, the scanned image becomes crooked and distorted. The utilization of the scanner is greatly impaired. This is a serious problem which urgently needs a solution.

SUMMARY

The object of this invention is to provide a scanner which is capable of reading a thick book without any distortion. Another object of this invention is to extend the scanning range of the scanner.

These objects are achieved by using an obtuse angle between the edge of scanning window of the scanner and the frame supporting the window. The binding edge of the book is then placed snugly over this obtuse angle corner to avoid any distortion. This obtuse angle also makes room for the image reading head to traverse to the very edge of the scanning window.

DETAILED DESCRIPTION OF THE PREFERRED EMBODIMENT

Figure 1:
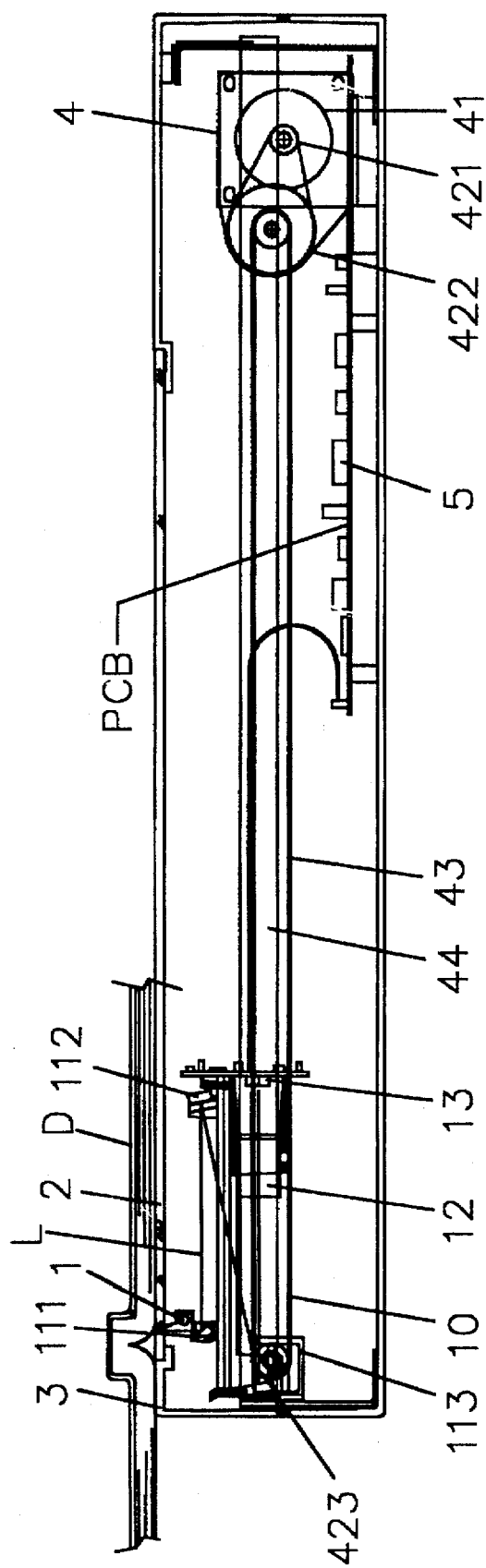
FIG. 1 shows the basic structure of a flat-bed scanner.
Figure 2:
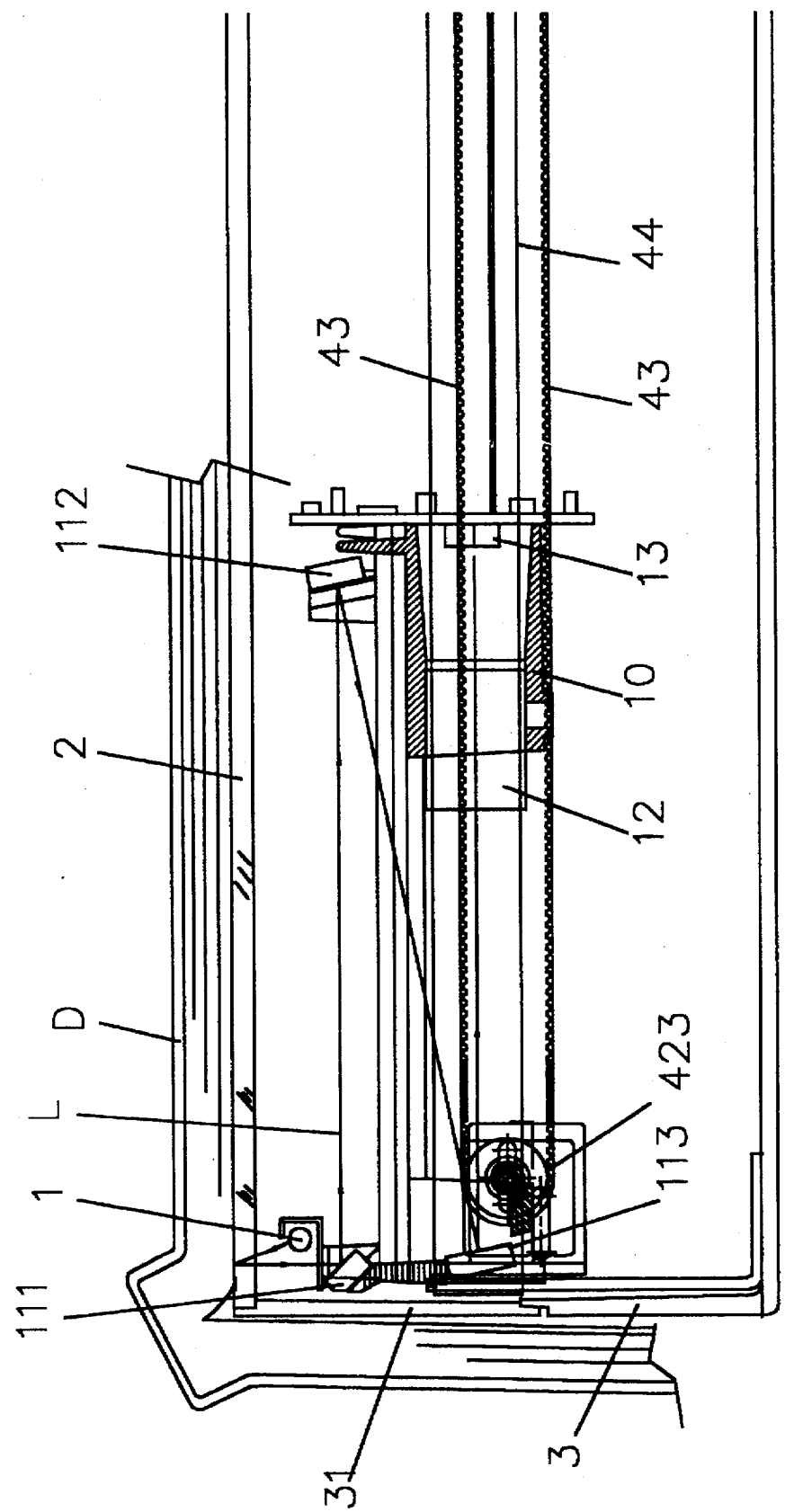
FIG. 2 shows the scanner structure which this invention improves, using an obtuse flange to connect the frame of the scanner to the glass window of the scanner.

FIG. 2 shows a section of a scanner based on this invention. The general structure is similar to a conventional scanner. The feature of this invention lies in the light path of the image reading head 10 and the shape of the frame 3. As shown in the FIG. 2, the reflecting mirror is placed directly under the light source 1, which is in parallel with the binding edge of book D and capable of scanning in a direction perpendicular to the binding edge of the book D. The placement of the reflecting mirror 113 is directly underneath and slightly outside the reflecting mirror 111, and is different from that of conventional image reading head which places the reflecting mirror 113 outside the reflecting mirror 111 as shown in FIG. 1. In so doing, the distance between light source 1 and the left edge of the image reader 10 is reduced. Furthermore, the idler 423 is moved inside the reflecting mirror 113, so that the light source 1 can scan up to the outermost edge of the image reader 10. This design permits the scanning point to reach the very edge of the top scanning window.

Another feature of this invention is the design of the frame which supports the scan window by providing a bent flange to connect with the scan window. The connection between the frame and the scan glass forms an obtuse angle. This structure is different from the conventional structure shown in FIG. 1 which uses a flat horizontal flange to connect the frame at one end and support the scan glass at the other end. The bent flange makes room for the image head 10 to tranverse so that the light source 1 can scan further toward to edge of the scan glass 2.

During scanning, the binding edge of a book D wraps snugly at the obtuse angle flange 3a between the scanning window 2 and the frame 3, so that the binding region of the book D is in complete contact with the scanning window for effecting planar scanning without any distortion.

Figure 3:
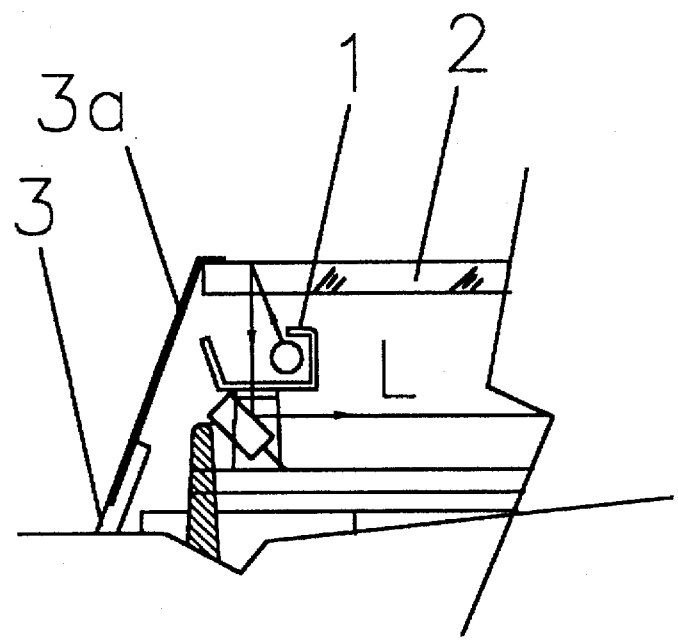
FIG. 3 shows an enlarged view of the end zone of the scanner in FIG. 2 when the light source scans near that end zone.

FIG. 3 shows an enlarged view of the section of the image reader where the light source 1 and the first reflecting mirror 111 is located.

Figure 4:
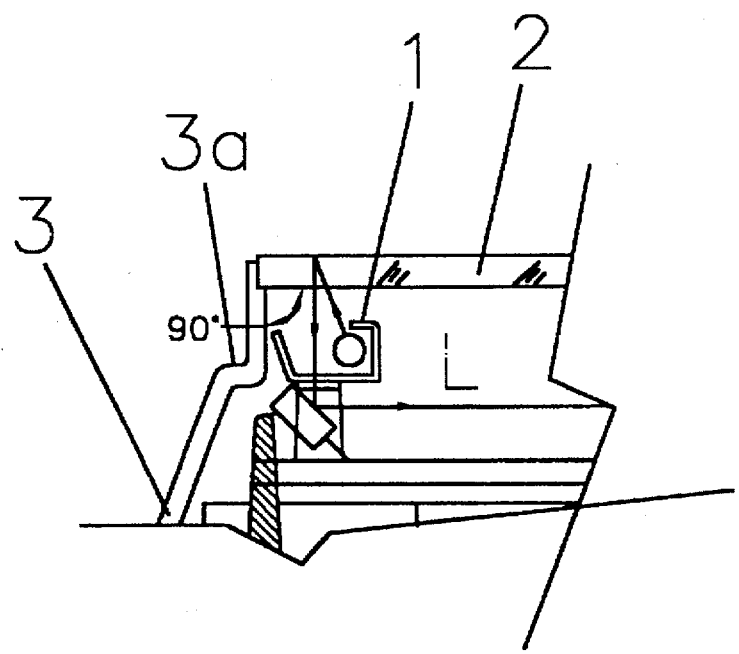
FIG. 4 shows another end zone construction with a recess at top of the frame to hold the window without using a flange.

FIG. 4 shows another embodiment of the present invention where no flange is used. The frame 3 itself forms an obtuse angle with the scanning glass window 2 and has an extension 3a which has a recess at the top end for the scanning glass 2 window to rest.

Figure 5:
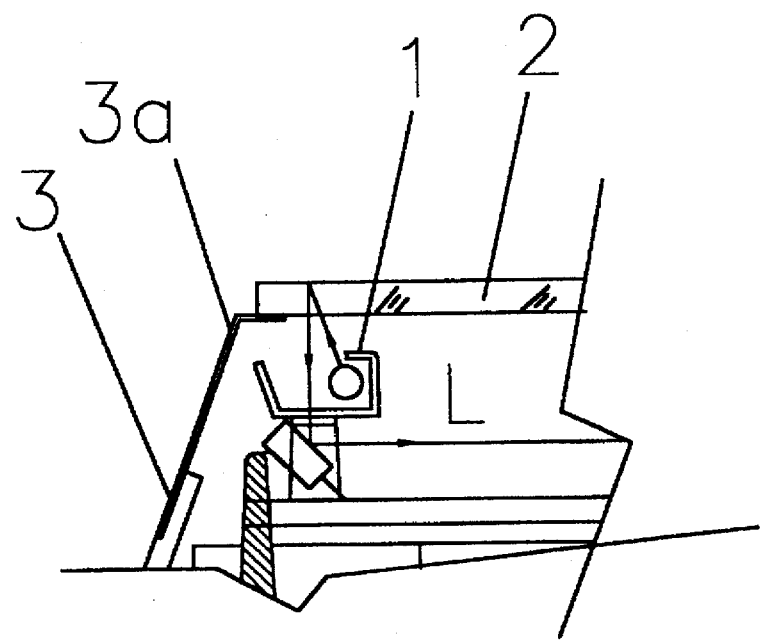
FIG. 5 shows a modification of the structure shown in FIG. 3.

FIG. 5 shows a modification of the structure shown in FIG. 3. In FIG. 5, the scanning glass window 2 rests on top of the bent flange 3a rather than beneath the bent flange 3a.

Figure 6:
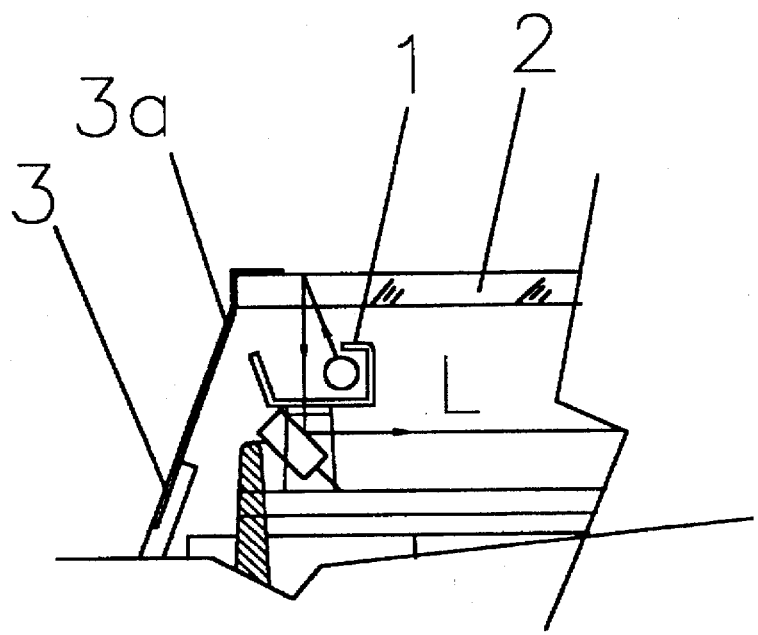
FIG. 6 shows another modification of FIG. 3.

FIG. 6 shows still another modification of the structure shown in FIG. 3. The slanted flange 3a is shaped into right angle at the top for attaching to the scanning glass window 2. This structure holds the scan glass more tightly.

Figure 7:
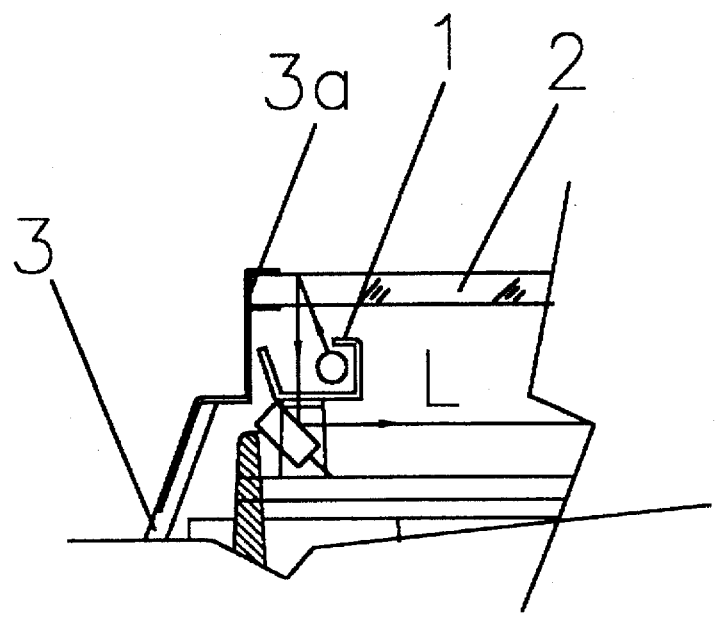
FIG. 7 shows a structure using a clamp at top of the flange to hold the glass.

FIG. 7 is another modification of FIG. 6. The right angle end of the flange 3a is provided with a lower jaw to clamp the scan glass more firmly.

Figure 8:
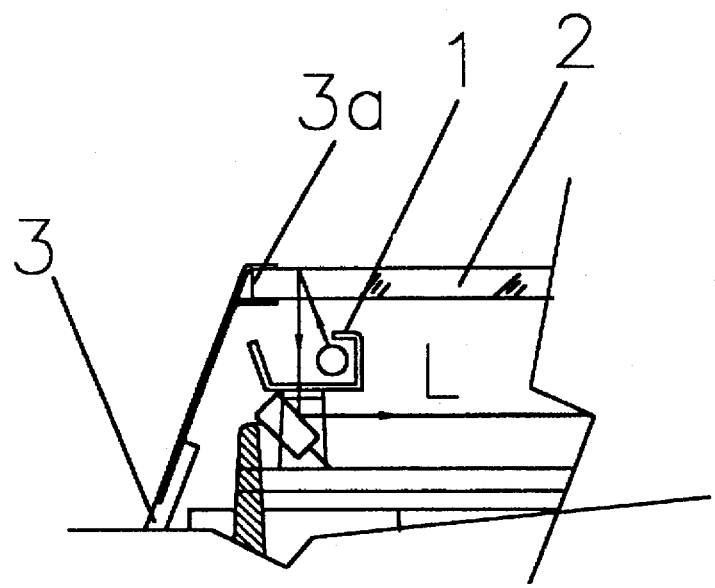
FIG. 8 shows a modification of FIG. 7.

FIG. 8 is a modification of FIG. 3 in that a lower jaw is added near the top of the flange 3a to clamp the scanning glass window 2 more firmly.

Figure 9:
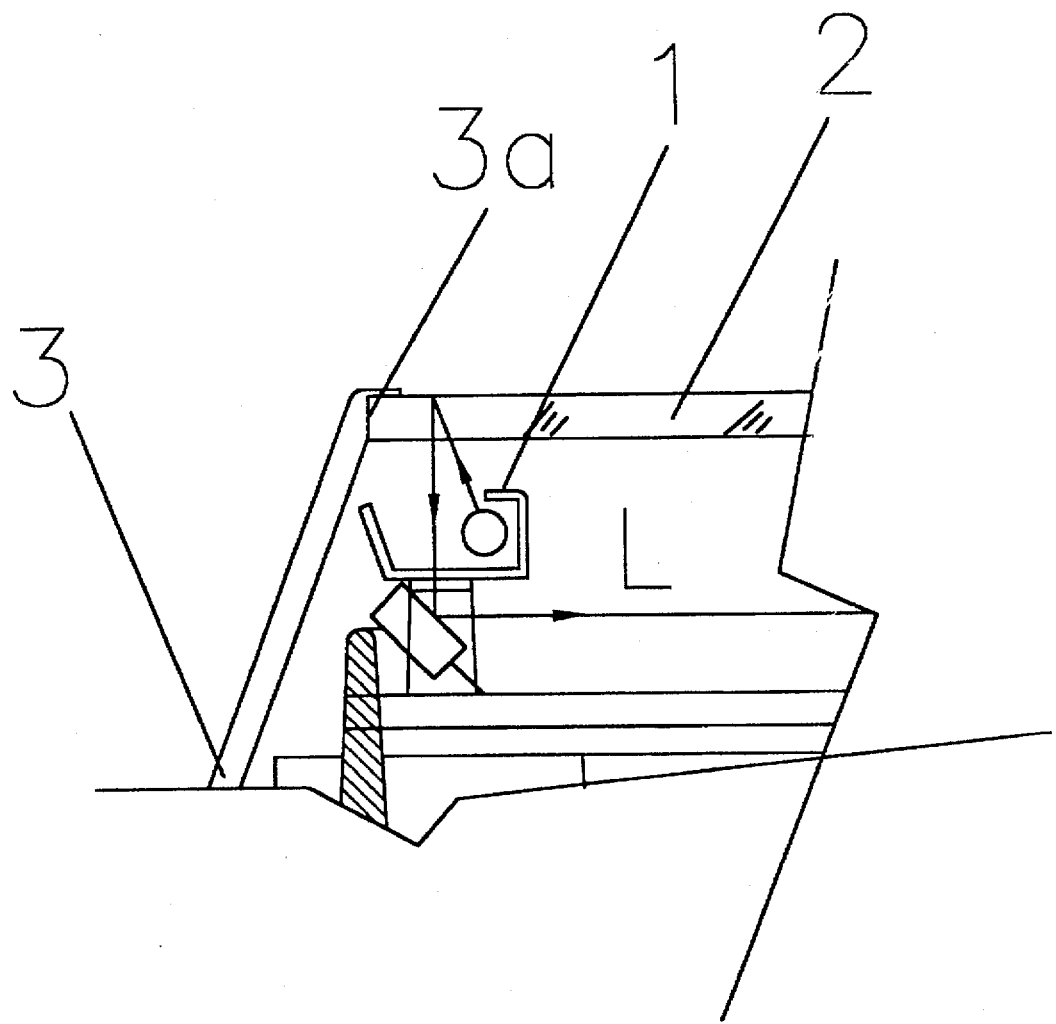
FIG. 9 shows a modification of FIG. 4.
Figure 2:
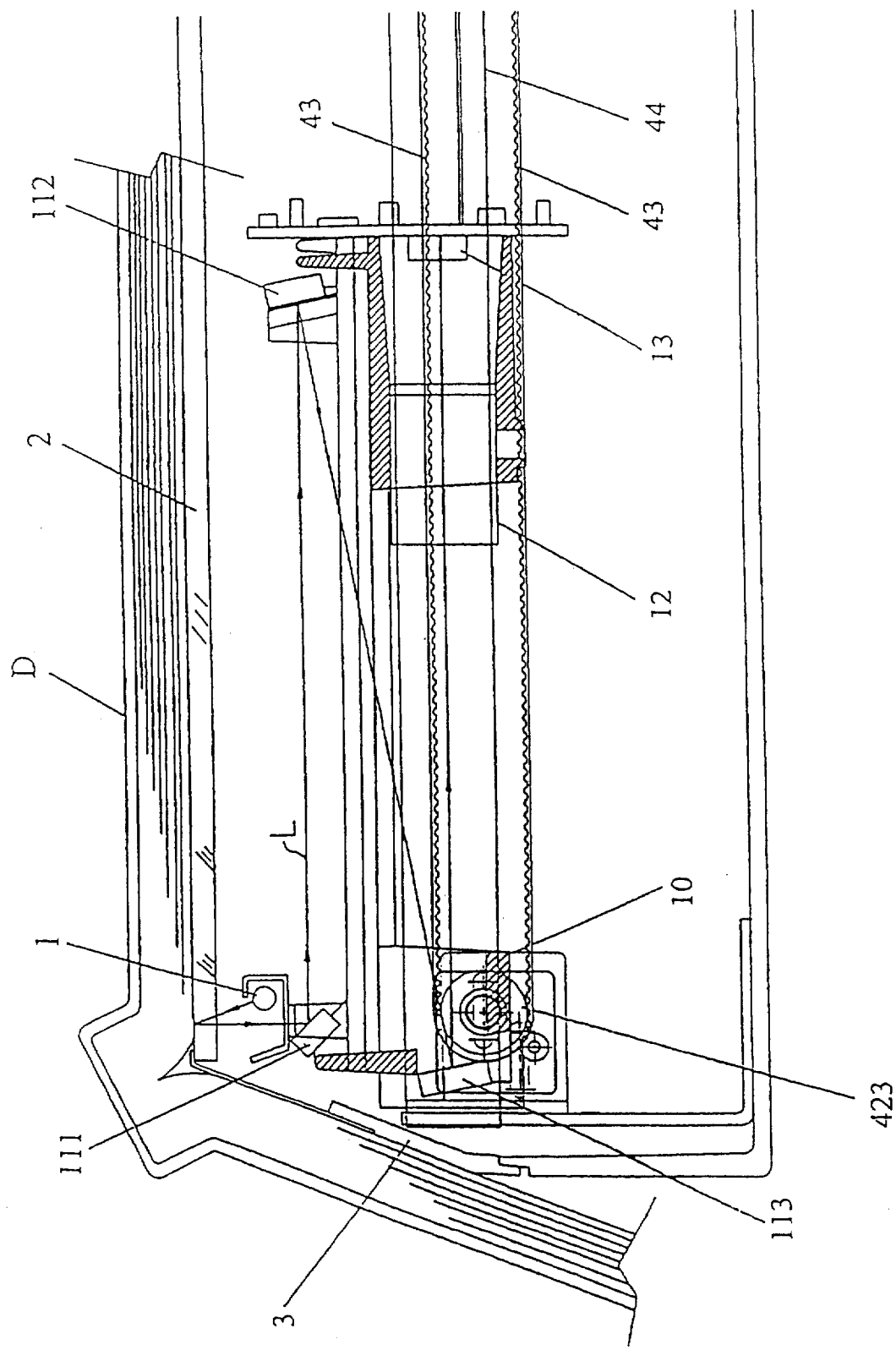

FIG. 9 shows another modification of the present invnetion. No flange is used. The scanning glass window 2 is attached directly to frame 3 at the top. The top end of the frame has a right-angle recess 3a to hold the scan glass firmly. The frame itself is bent to make room for the light source 1 to traverse to the end of the scan glass.

With the above construction, the object of this invention can be achieved by extending the scanning area to the edge of the scanning glass window. By constructing the side wall of the frame at an obtuse angle with the scanning glass window, it is possible to scan the image up to the edge of the side wall. Thus, this invention not only eliminates the distortion, but also reduces the size of the scanner.

The foregoing description refers to a few particular embodiments of this invention. It should be pointed out that the structure also applies to a copier. Any other applications or any variations of these features are all within the scope of this invention.

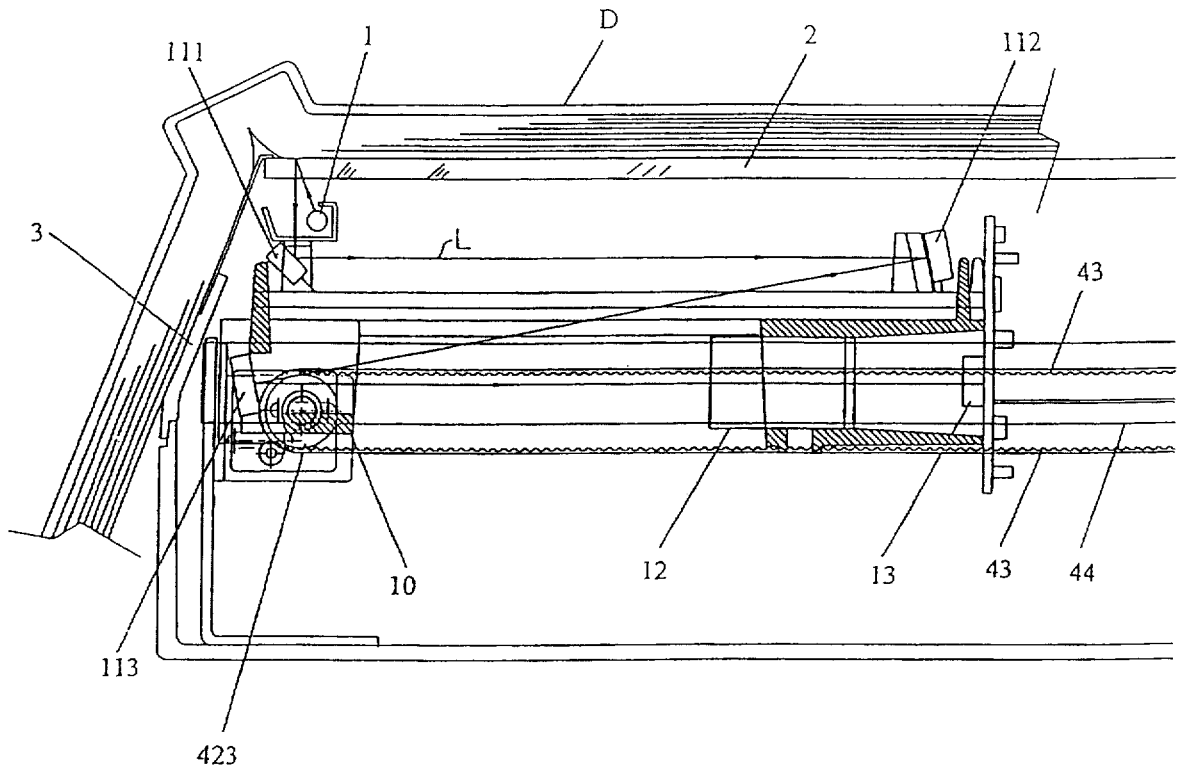

What is claimed is:

1. A flat-bed image scanning system capable of scanning a document to the binding edge of a page for reducing distortion, comprising:

a frame;

a scanning window lying on top of said frame and forming an obtuse angle with said frame for aligning with the binding edge of said document placed on top of said window, wherein said obtuse angle is formed in a flange attached at one end of said frame and at the other end of said flange to said window;

an integral image reading head;

a driving mechanism for sliding said image reading head underneath said scanning window along a rail;

said integral image reading head having all parts moving together comprising:

a scanning light source, which is in parallel with said binding edge and scans in a direction perpendicular to said binding edge, for illuminating said page to obtain optical signals;

a series of reflecting mirrors for reflecting said optical signals of the area scanned by said light source to said image reading head, placed underneath said window, and a light sensor for sensing said optical signals.

2. A flat-bed scanner as described in claim 1, wherein said flange is attached to said window at the lower side of said scanning window.

3. A flat-bed scanner as described in claim 1, wherein said window is clamped to said flange double with an upper jaw and a lower jaw.

4. A flat-bed scanner as described in claim 3, wherein said flange forms a right angle with said window.

5. A flat-bed scanner as described in claim 3, wherein said flange forms an obtuse angle with said window.

6. A flat-bed image scanning system capable of scanning a document to the binding edge of a page for reducing distortion, comprising:

a frame;

a scanning window lying on top of said frame and forming an obtuse angle with said frame for aligning with the binding edge of said document placed on top of said window, wherein said obtuse angle is formed in a flange attached at one end to said frame and the other end of said flange to said window, and said flange is attached to said window at the upper side of said scanning window;

an integral image reading head;

a driving mechanism for sliding said image reading head underneath said scanning window along a rail;

said integral image reading head having all parts moving together which comprise:

a scanning light source for illuminating said page to obtain optical signals, a series of reflecting mirrors for reflecting said optical signals of the area scanned by said light source to said image reading head, placed underneath said window, and an light sensor for sensing said optical signals.

* * * * *

UNITED STATES PATENT AND TRADEMARK OFFICE
CERTIFICATE OF CORRECTION

PATENT NO. : 5,712,718
DATED : Jan. 27, 1998
INVENTOR(S) : Philip L. CHEN

It is certified that error appears in the above-identified patent and that said Letters Patent is hereby corrected as shown below:

The title page should be deleted to appear as per attached title page.

Please delete drawing sheet 2 of 6 and substitute drawing sheet 2 of 6 as per attached.

Signed and Sealed this

Twenty-second Day of June, 1999

Attest:

Q. TODD DICKINSON

*Attesting Officer*     *Acting Commissioner of Patents and Trademarks*

United States Patent [19]

Chen

[11] Patent Number: 5,712,718
[45] Date of Patent: Jan. 27, 1998

[54] BOOK-EDGE FLAT-BED SCANNER

[75] Inventor: Philip L. Chen, E. Rolling Hills, Calif.

[73] Assignee: Avision, Inc., Hsinchu, Taiwan

[21] Appl. No.: 824,129

[22] Filed: Mar. 26, 1997

Related U.S. Application Data

[63] Continuation of Ser. No. 526,356, Sep. 11, 1995, abandoned.

[51] Int. Cl.[6] .................................................. G02B 26/08
[52] U.S. Cl. ........................... 359/201; 355/25; 358/474; 399/211
[58] Field of Search .............................. 359/196, 197, 359/201, 212, 223; 250/234–236; 358/474, 475, 487, 497; 355/25, 228, 229, 232, 233, 82; 399/193, 211

[56] References Cited

U.S. PATENT DOCUMENTS

| 3,395,610 | 8/1968 | Evans et al. | 355/233 |
| 5,012,275 | 4/1991 | Bock | 355/233 |
| 5,475,505 | 12/1995 | Minasian et al. | 358/474 |

Primary Examiner—James Phan
Attorney, Agent, or Firm—H. C. Lin, Patent Agent

[57] ABSTRACT

This invention provides a flat-bed scanner capable of scanning a thick book without any distortion at the protruding binding edge. The scanning window forms an obtuse angle with the frame of the scanner supporting the scanning window. The obtuse angle allows the binding edge of the book to rest snugly over the window. The slanted structure of the frame also makes room for the image reading head to scan to the very edge of the page of the document.

6 Claims, 6 Drawing Sheets